United States Patent

Devienne et al.

[15] 3,638,705
[45] Feb. 1, 1972

[54] PNEUMATIC TIRE

[72] Inventors: Andre Devienne; Jean Trzepaez, both of Compiegne (Oise), France

[73] Assignee: Uniroyal Englebert France S.A., Neuilly sur Seine, France

[22] Filed: Nov. 19, 1969

[21] Appl. No.: 878,112

[30] Foreign Application Priority Data

Dec. 31, 1968 France...................................182,994

[52] U.S. Cl............................................152/356, 152/362
[51] Int. Cl.........................................................B60c 15/06
[58] Field of Search...........................152/354, 355, 356, 362

[56] References Cited

UNITED STATES PATENTS

| | | | |
|---|---|---|---|
| 2,155,564 | 4/1939 | Schippel | 295/12 |
| 2,888,058 | 5/1959 | Manis et al. | 152/362 |
| 3,052,275 | 9/1962 | Hylbert, Jr. | 152/354 |
| 3,077,915 | 2/1963 | Weber | 152/355 |
| 3,245,455 | 4/1966 | Lewis | 152/356 |
| 2,063,105 | 12/1936 | King | 152/356 |
| 3,254,694 | 6/1966 | Sparks et al. | 152/362 R |

FOREIGN PATENTS OR APPLICATIONS

879,365 6/1953 Germany............................152/362 CS

Primary Examiner—Arthur L. La Point
Assistant Examiner—Robert Saifer
Attorney—Jack Posin

[57] ABSTRACT

A heavy-duty, radial ply, pneumatic tire having normally flexible sidewall zones, reinforced, rigid bead zones, and transition zones of gradually decreasing stiffness extending outwardly from the bead zones to the sidewall zones. Each side of the tire includes: (1) an inner group of radial carcass plies, the ends of such plies being turned outwardly over a bead wire bundle and being staged so as to terminate at least at two different points in the transition zone; (2) an outer group of radial carcass plies, the ends of such plies being turned inwardly over the bead wire bundle and being staged so as to terminate at least at two different points in the bead zone; (3) a plurality of chafers having staged upper ends terminating at a plurality of different points in the transition zone; and (4) one or more flippers which encircle the bead wire bundle and at least a portion of an apex strip adjacent to the bead wire bundle.

10 Claims, 2 Drawing Figures

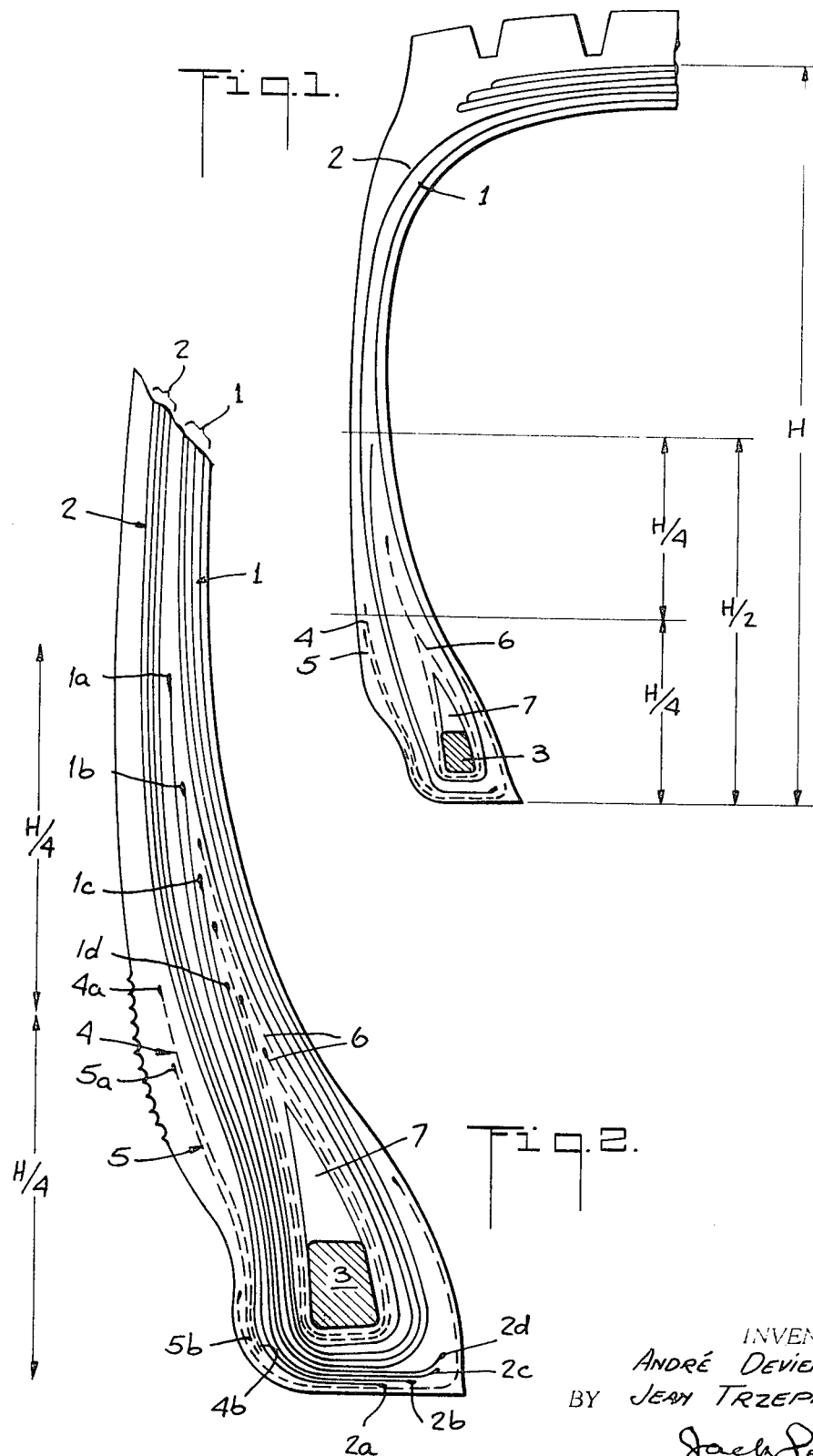

PNEUMATIC TIRE

This invention relates to pneumatic tires and, more particularly, to heavy-duty, radial ply, pneumatic tires having reinforced bead zones.

In radial ply tire casings one or more carcass plies having radially oriented cords, are folded about axially spaced bead wire bundles. Although the radial carcass plies impart to the casings a flexibility and pliancy which enhances the comfort of the user, this very flexibility makes it necessary to stiffen the tread zones of the casings (with one or more circumferential belts) to enhance their resistance to transverse deformation, and to stiffen the bead zones of the casings in order to provide for more permanent seating of the beads on their respective wheel rims.

With reference more particularly to the reinforcement of the bead zones, experience teaches that when tire casings reach a certain size, the reinforcement of the bead zones constituted by the folding of a radial ply or plies around bead wire bundles proves to be inadequate. Therefore, it has long been the practice in the tire art to dispose additional reinforcing elements, known in the trade as "chafers" and "flippers," in the bead zones of heavy-duty radial ply tires. These elements, comprising circumferential reinforcing strips, make it possible to obtain beads zones having the desired rigidity.

Experience also teaches that when tire casings with rigid beads must concurrently withstand heavy loads and substantial deformations, they deteriorate very rapidly in that portion of the casing which interconnects the pliant and flexible casing sidewall portions with the rigid bead areas of the casings. Studies and tests have shown that this deterioration can be significantly reduced by creating, between the rigid bead zones of the casing and the zones of greatest flexibility in the sidewalls, transitions zones of smoothly varying rigidity in which the rigidity of the casing gradually decreases from the bead zones to the corresponding sidewalls.

The present invention, therefore, has for its primary object the provision of a heavy-duty, radial ply tire casing having at each side thereof a flexible sidewall, a reinforced rigid bead zone, and a transition zone of gradually decreasing stiffness extending outwardly from the bead zone to the point, at substantially midheight of the casing sidewall, where normal flexibility and pliancy of the sidewall occurs.

Further objects and advantages of this invention will become apparent as the following description proceeds.

Briefly stated, and in accordance with one embodiment of this invention, there is provided a tire casing, comprising: (1) an inner group of carcass plies having radially oriented cords, the marginal portions of the plies being folded about respective axially spaced beads wire bundles, from the inside to the outside of the casing, the ends of the plies being at least partially staged between midheight and quarter-height of the casing, measured from the base of the bead zone; (2) an outer group of carcass plies having radial cords, the marginal portions of the plies being wrapped, from the outside to the inside of the casing, about both the respective bead wire bundles and the aforesaid marginal portions of the inner group of carcass plies; (3) at least two reinforcing chafers positioned outwardly of the outer group of radial carcass plies in each bead zone, the chafers having cords therein which are crossed from one chafer to the other, the upper end of one of the chafers being situated at or below the level of the mean height of the corresponding turnups of the plies in the inner group of carcass plies, the upper end of the other chafer being spaced from the upper end of the first chafer and being situated between the upper level of the corresponding bead wire bundle and the upper end of the first chafer; (4) at least one flipper positioned within the folded marginal portion of the inner group of radial carcass plies in each bead zone, each such flipper enveloping the bead wire bundle and at least a portion of a rubber apex filler element in each such bead zone.

The term "rubber" is used in a generic manner in this specification in describing and claiming materials which may be used with this invention, and it will be understood that this term is meant to include not only natural rubber, but synthetic rubbers and rubberlike materials which may be suitable for use in the manufacture of pneumatic tires. The term "cords" is used in a generic manner in this specification in describing and claiming materials which may be used with this invention, and it will be understood that this term has reference to generally inextensible, substantially nonwoven, filaments, cords or cables made of any of a number of conventional either metallic or nonmetallic cord-forming materials which are normally used or may become useful as a reinforcement means in a pneumatic tire (e.g., cotton, rayon, nylon, polyester, glass fiber, steel wire, and the like.

Although the specification concludes with claims particularly pointing out and distinctly claiming the subject matter which is regarded as the invention, it is believed that the invention will be better understood from the following description, taken in conjunction with the accompanying drawings, in which:

FIG. 1 represents a schematic view in radial section of a portion of a tire casing made in accordance with this invention, the view illustrating that portion of the casing which extends from one of the beads to approximately the midcircumferential plane of the casing; and, FIG. 2 is an enlarged view, similar to FIG. 1, showing the bead zone, the transition zone and a portion of the sidewall zone of the tire casing in greater detail than in FIG. 1.

Referring to FIG. 1, a radial ply tire casing made in accordance with the present invention comprises an inner group 1 of radial plies and an outer group 2 of radial plies, the plies in group 1 being folded outwardly around a bead wire bundle 3 and up to a height of about half the height of the casing, the plies in group 2 being folded inwardly around the bead wire bundle 3, below the plies of group 1. The tire casing further includes a lateral reinforcement in the bead zone thereof constituted by at least two chafers 4 and 5 which are provided with cords therein of low stretchability, for example metal, and by one or more flippers 6 which surround the bead wire bundle 3 and at least a portion of a rubber apex filler element 7 associated with the bead wire bundle, the flippers 6 being disposed inside the folded portions of the plies of inner group 1.

Referring more particularly to FIG. 2, the inner group of radial plies 1 comprises, for example, four plies 1a, 1b, 1c, and 1d, these plies being folded at their marginal portions around the bead wire bundle 3 and staged, regularly or not, over a height equal to one-quarter of the height H of the casing, the end of the outermost ply 1a, being placed substantially at midheight H/2 of the casing, the end of the innermost ply 1d being placed at a distance of about H/4 from the base of the bead, the ends of the plies 1b and 1c occupying intermediate positions between the ends of plies 1a and 1d. The outer group of radial plies 2 comprises, for example, four plies 2a, 2b, 2c and 2d, these plies being folded at their marginal portions under both the bead wire bundle 3 and the folded marginal portions of the plies in group 1. The ends of plies 2a–2d are preferably staged to terminate at spaced points after passing across substantially the entire width of the base of the bead zone.

The reinforcing chafers 4 and 5 are constituted by layers of cords of round, oval or flat cross section having low stretchability, for example metal, glass or a natural or synthetic textile material, each layer being embedded in rubber having a Shore A hardness of between approximately 65° and 80°. The cords of one of the chafers 4 and 5 form crossing angles with respect to the cords of the other of the chafers, each layer of filaments, cords or cables forming an angle with a radial plane of the casing of either between 20° and 60° or between −20° and −60°, preferably either 40° or −40°.

The upper (radially outer) ends 4a and 5a of the chafers 4 and 5 are radially spaced from one another (staged) to insure that there is a smooth and gradual change of flexibility in the transition zone of the casing, the end 4a of chafer 4 being situated at, or below, a level corresponding to the mean height of the ends of the plies 1a–1d in group 1, the end 5a of chafer 5 being spaced from the end 4a and being situated between the upper level of bead wire bundle 3 and the level of the end 4a of chafer 4. The lower ends 4b and 5b of chafers 4 and 5 terminate in that portion of the bead zone which is situated below the upper level of the bead wire bundle 3. The chafers 4 and 5 are preferably designed to have sufficient rigidity to obviate any need for providing conventional hard rubber reinforcing cushions in the portions of the bead zones in which they are located.

A flipper layer, or a group of flipper layers, 6 is disposed about the bead wire bundle 3 and the rubber apex element 7 in order to add to the rigidity of the casing in the bead zone. The flippers 6 are preferably provided with cords of a material having low stretchability, for example metal, glass or a natural or synthetic textile material. Alternatively, the flippers 6 can be comprised of a natural or synthetic textile felt, for example nylon, polyester or glass fiber, loaded with a mixture of hard rubber having a Shore A hardness of between 70° and 85°. The ends of the various flipper layers 6 are preferably also staged to terminate at spaced apart points in the transition zone of the casing.

While there has been shown and described what is at present considered to be the preferred embodiment of this invention, it will be obvious to those skilled in the art that various changes and modifications may be made therein without departing from this invention in its broader aspects. Thus, for example, the folded ends 1a–1d of the plies in inner group 1 can be grouped and staged in pairs, the ends 1a and 1b on the one hand, and 1c and 1d on the other, coinciding to form two staged subgroups, or the ends 1b and 1c coinciding and being disposed between the ends 1a and 1d. Similarly, when the lower ply ends of the plies of group 2 are staged in the base of the bead zone, alternative groupings, analogous to those indicated above with respect to the plies of group 1, may be employed. Also, more than two reinforcing chafers 4 and 5 can be utilized, the upper ends of the additional chafers being positioned at the same level as either chafer end 4a and 5a, or being positioned between these two levels, the lower ends of the additional chafers being positioned in the bead zone, between the upper level of the bead wire bundle 3 and the base of the bead zone. In addition, the relative disposition of the chafers can be the reverse of that shown in FIG. 2. In this case the upper end 4a of the inner chafer would be situated at the lower level and the upper end 5a of the outer chafer would be situated at the higher level of the two chafer end levels illustrated in FIG. 2. Finally, the characteristics of the cords employed in the chafers and flippers, for example their tensile strengths, densities and thicknesses, can be selected as a function of the dimensions of the casing and/or the loads which they are designed to support, these characteristics perhaps being the same for the chafers and flippers under some circumstances and different under others.

Accordingly, it is aimed in the appended claims to cover all such changes and modifications to the embodiments of the invention described herein as fall within the true spirit and scope of this invention.

Having thus described the invention, what is claimed as new and desired to be protected by Letters Patent is:

1. A radial ply pneumatic tire having at each side thereof a rigid bead zone including a bead wire bundle and a rubber apex strip therein, a flexible sidewall zone spaced from the bead zone and a transition zone of gradually decreasing stiffness extending radially outwardly from the bead zone to the sidewall zone, said tire further comprising:

a. an inner group of carcass plies having substantially radial cords, the ends of said plies being turned up outwardly about the bead wire bundle at each side of the tire, the ends of said plies at each side of the tire being staged to terminate at least at two spaced points located between one half and one quarter of the height of the casing above the base of the bead zone;
   b. an outer group of carcass plies having substantially radial cords, the ends of said plies at each side of the tire being turned inwardly below both the bead wire bundle and the plies of said inner group at each side of the tire;
   c. a plurality of reinforcing chafers of bias cut cord fabric in each bead zone positioned axially outwardly of said outer group of carcass plies, the cords of one of said chafers forming crossing angles with respect to the cords of another of said chafers, the radially outer end of one of said chafers being positioned no further outwardly than the mean radius of the ends of the plies in said inner group of carcass plies, the radially outer end of another of said chafers being spaced from the radially outer end of said one of said chafers and being positioned between the radially outer level of the bead wire bundle in said bead zone and the level of the radially outer end of said one of said chafers; and
   d. eventually one or more flippers in each bead zone, said flipper being positioned within the turned up portion of the inner group of said carcass plies, said flipper enveloping the bead wire bundle in each bead zone and at least a portion of said apex strip in said zone.

2. A tire as described in claim 1 wherein said flipper completely envelops said apex strip in said zone.

3. A tire as described in claim 2 wherein the cords of said chafers are embedded in rubber having a Shore A hardness of between 65° and 80°.

4. A tire as described in claim 3 wherein the radially inner ends of said chafers are positioned between the radially outer level of said bead wire bundle and the radially innermost portion of the bead zone.

5. A tire as described in claim 4 wherein the ends of the plies in the outer group of carcass plies are staged to terminate at least at two spaced points in each bead zone of said tire.

6. A tire as described in claim 5 wherein said flipper comprises elongated cords embedded in rubber having a Shore A hardness of between 65° and 80°.

7. A tire as described in claim 2 wherein said flippers comprise a natural or synthetic felt loaded with rubber having a Shore A hardness of between 70° and 85°.

8. A tire as described in claim 2 wherein the ends of said flipper are staged to terminate at spaced-apart points in said transition zone.

9. A tire as described in claim 8 and further including a second flipper enveloping said bead wire bundle and said apex strip, the ends of said second flipper being staged to terminate at points in said transition zone spaced both from each other and from the ends of said first flipper.

10. A tire as described in claim 9 wherein said flippers and said chafers each comprise elongated cords embedded in rubber having a Shore A hardness of between 65° and 80°.

* * * * *